(12) United States Patent
Thurmeier et al.

(10) Patent No.: US 11,072,248 B2
(45) Date of Patent: Jul. 27, 2021

(54) BATTERY FOR A MOTOR VEHICLE, AND MOTOR VEHICLE

(71) Applicant: AUDI AG, Ingolstadt (DE)

(72) Inventors: Markus Thurmeier, Adlkofen (DE); Uwe Gerlinger, Kipfenberg (DE); Boris Koch, Wermelskirchen (DE); Maik Schulte, Cologne (DE); Frank Krause, Bergisch Gladbach (DE); Lukas Schroeer, Essen (DE)

(73) Assignee: AUDI AG, Ingolstadt (DE)

( * ) Notice: Subject to any disclaimer, the term of this patent is extended or adjusted under 35 U.S.C. 154(b) by 85 days.

(21) Appl. No.: 16/603,915

(22) PCT Filed: Apr. 4, 2018

(86) PCT No.: PCT/EP2018/058524
§ 371 (c)(1),
(2) Date: Oct. 9, 2019

(87) PCT Pub. No.: WO2018/188995
PCT Pub. Date: Oct. 18, 2018

(65) Prior Publication Data
US 2020/0122589 A1   Apr. 23, 2020

(30) Foreign Application Priority Data

Apr. 11, 2017   (DE) .................. 10 2017 206 185.5

(51) Int. Cl.
| | |
|---|---|
| *H01M 10/613* | (2014.01) |
| *H01M 10/625* | (2014.01) |
| *H01M 10/653* | (2014.01) |
| *H01M 10/6556* | (2014.01) |
| *H01M 2/10* | (2006.01) |
| *B60L 50/64* | (2019.01) |
| *B60L 58/26* | (2019.01) |
| *H01M 50/20* | (2021.01) |

(52) U.S. Cl.
CPC ............... *B60L 50/64* (2019.02); *B60L 58/26* (2019.02); *H01M 10/613* (2015.04); *H01M 10/625* (2015.04); *H01M 10/653* (2015.04); *H01M 10/6556* (2015.04); *H01M 50/20* (2021.01); *H01M 2220/20* (2013.01)

(58) Field of Classification Search
CPC ........ B60L 50/64; B60L 58/26; H01M 50/20; H01M 10/613; H01M 10/625; H01M 10/653; H01M 10/6556; H01M 2220/20; Y02E 60/10; Y02T 10/70
See application file for complete search history.

(56) References Cited

U.S. PATENT DOCUMENTS

| | | | |
|---|---|---|---|
| 2014/0322582 A1* | 10/2014 | Ruter .................... | H01M 50/20 429/120 |
| 2015/0171486 A1* | 6/2015 | Rawlinson .......... | H01M 10/613 324/426 |
| 2016/0356498 A1* | 12/2016 | Gerendas ................ | F23R 3/002 |
| 2018/0175466 A1* | 6/2018 | Seo .................... | H01M 10/6551 |
| 2018/0301771 A1* | 10/2018 | Jennrich ............... | H01M 50/10 |
| 2018/0337433 A1* | 11/2018 | Champagne .......... | B60L 3/0046 |

FOREIGN PATENT DOCUMENTS

| | | |
|---|---|---|
| DE | 102008056859 A1 | 5/2010 |
| DE | 102011082562 A1 | 3/2013 |
| DE | 102012205810 A1 | 10/2013 |
| DE | 102012208239 A1 | 11/2013 |
| DE | 202014007474 U1 | 9/2015 |
| DE | 102014218137 A1 | 3/2016 |
| DE | 102015219280 A1 | 4/2017 |

OTHER PUBLICATIONS

International Preliminary Report on Patentability (Chapter I) dated Oct. 24, 2019, in corresponding International application No. PCT/EP2018/058524; 10 pages.
German Examination Report dated Feb. 1, 2018 in corresponding German Application No. 10 2017 206 185.5; 16 pages; Machine translation attached.
International Search Report and Written Opinion dated Sep. 27, 2018 in corresponding International Application No. PCT/EP2018/058524; 38 pages; Machine translation attached.

* cited by examiner

*Primary Examiner* — Muhammad S Siddiquee
(74) *Attorney, Agent, or Firm* — Maier & Maier, PLLC

(57) ABSTRACT

A battery for a motor vehicle, with at least one battery module, which has a plurality of battery cells. The at least one battery module is arranged in a battery housing of the battery. The battery has a cooling device for cooling the battery cells by means of a cooling medium. The cooling device comprises at least one wall of the battery housing, with which the at least one battery module closely fits, and which is formed from a heat-conducting plastic at least in areas. The heat-conducting plastic restricts at least one duct for the cooling medium, with the duct being formed in at least one wall of the battery housing.

9 Claims, 2 Drawing Sheets

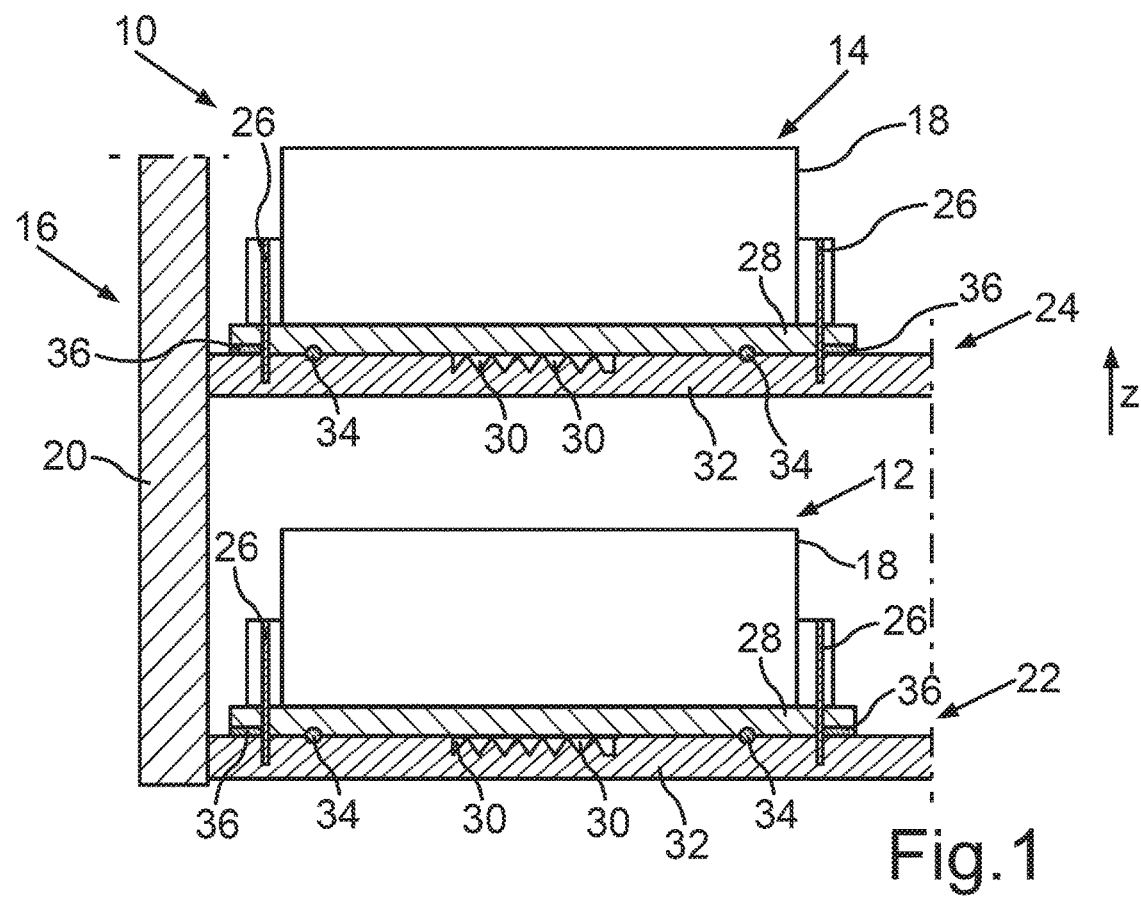
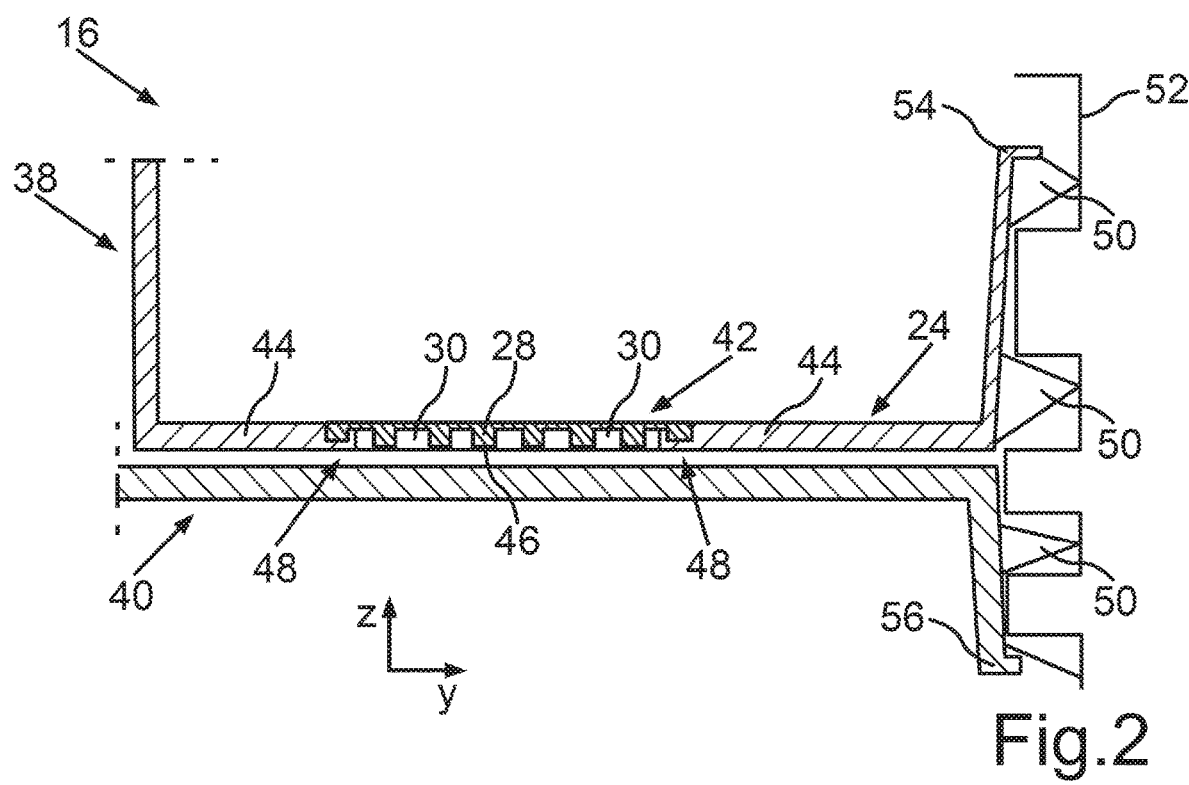

BATTERY FOR A MOTOR VEHICLE, AND MOTOR VEHICLE

FIELD

The invention relates to a battery for a motor vehicle, with at least one battery module, which has a plurality of battery cells. The at least one battery module is arranged in a battery housing of the battery. Furthermore, a cooling device is provided for cooling the battery cells by means of a cooling medium. The invention also relates to a motor vehicle with such a battery.

BACKGROUND

Currently, battery housings for batteries, as they are used as an electrical energy storage device, for example, in electric vehicles or hybrid vehicles, are usually produced from one piece and arranged between the axles of the motor vehicle. Extruded parts through which a cooling fluid flows may be provided as the cooling device in this case. Such extruded parts are then bonded to respective battery modules of the battery and pressed against the battery module.

Thus, DE 10 2014 218 137 A1 describes an energy storage system for a motor vehicle, in which an energy storage module to be cooled has multiple storage cells. A cooling element in the form of multiple flat tubes is pressed from below against a module side to be cooled by means of a spring plate.

What is disadvantageous in this case is the fact that the provision of such a cooling element in the vertical direction of the battery requires a comparatively large installation space. Designs in which multiple battery modules are to be arranged above one another in levels or layers in the vertical direction of the battery can thereby barely be implemented. In addition, the arrangement of multiple battery modules with respective cooling elements or cooling devices in levels arranged above one another would greatly increase the costs for the battery. The reason for this is that respective cross-sections would have to be provided for coolant intake and for coolant drainage This also increases the installation space needed for the battery vertically as relates to the vertical direction, particularly in the longitudinal direction of the vehicle. The reason for this is, in order to attach such manifolds to the sides of the battery modules stacked above one another, brackets or carriers taking up a comparatively large installation space would have to be provided.

SUMMARY

Thus, the object of the present invention is to obtain a battery of the aforementioned type, in which the cooling device requires an especially small installation space, and to obtain a motor vehicle with at least one such battery.

The battery according to the invention for a motor vehicle comprises at least one battery module, which has a plurality of battery cells. The at least one battery module is arranged in a battery housing of the battery. The battery has a cooling device for cooling the battery cells by means of a cooling medium. The cooling device comprises at least one wall of the battery housing, with the at least one battery module fitting closely thereto. At least one wall is formed from a heat-conducting plastic, at least in areas. The heat-conducting plastic restricts at least one duct for the cooling medium, with the duct being formed in at least one wall of the battery housing. Thus, heat is transferred from the at least one battery module to be cooled to the cooling medium, particularly to a cooling fluid, via the heat-conducting plastic. Because the at least one duct for the cooling medium is formed in the at least one wall, the cooling device in this case requires an especially small installation space.

This provides advantages with respect to the package, i.e. the placement of the battery in the motor vehicle. In the event of an impact force caused by an accident, particularly more space can be provided for deformation due to the smaller size of the installation space required by the battery in the motor vehicle. For example, corresponding deformation elements can be placed in the installation space which is no longer required by the battery. This improves the crash performance of the motor vehicle.

In addition, the integration of the cooling device into the at least one wall of the battery housing results in cost savings. This is because a separate, complex cooling device does not have to be provided, and the effort for pressing such a cooling device against the battery module is dispensed with. Because no additional pipework is required, the associated installation space requirements and the associated costs are avoided.

Furthermore, due to the provision of the at least one duct in the at least one wall of the battery housing, the dissipation of heat to be achieved can be freely selected. This particularly applies when the wall of the battery housing is formed as an injection-molded part, at least in areas. Thus, particularly an especially large cooling capacity can be achieved with a simultaneously especially small flow of coolant and/or flow of cooling medium.

The formation of the at least one duct in the at least one wall of the battery housing furthermore enables the provision of complex, three-dimensional cooling structures and the generation of small, local circuits of the cooling medium at the site where heat develops. In addition, the formation of the at least one duct in the at least one wall of the battery housing ensures that no cooling medium reaches the battery module. This also applies in the event of a leak in the at least one duct. The reason for this is that the cooling layer of the battery provided by the wall is outside of a battery layer in which the at least one battery module is located. In this manner, a functional impairment of the battery module, for example in the form of a short circuit or the like, can particularly be prevented due to the use of a conductive cooling medium, for example a cooling fluid containing conductive components.

The thermal conductivity of the plastic is preferably greater than 0.8 W/mK, particularly greater than 1 W/mK. This can be achieved, for example, in that the plastic is provided with heat-conducting particles, which are formed, for example, from graphite, an aluminum alloy, and/or equally good heat-conducting materials.

The at least one wall can be formed as a base of the battery housing. Thus, a good arrangement, as required for the transfer of heat, of the battery module on the wall can be achieved due to the weight of the battery module. This particularly applies when the battery module is pressed against the base using clamping elements such as, for example, screws.

Alternatively, it is additionally preferred, however, when the at least one wall is formed as an intermediate base of the battery housing. The intermediate base is arranged between a first battery module and a second battery module, which is arranged above the first battery module in a vertical direction of the battery. Particularly with such a battery in which the battery modules are arranged in layers or levels stacked on top of one another, the integration of the cooling device into the base and/or the intermediate base is especially advantageous. This is because the size of the battery is reduced in the vertical direction. With the battery arranged in the motor vehicle, the vertical direction of the battery may particularly coincide with the vertical direction of the vehicle (Z direction). A reduction in the height of the battery in the Z direction provides advantages with respect to the package and crash performance.

Preferably, at least one collector duct, by means of which the cooling medium can be placed in the at least one duct formed in the base and in the at least one duct formed in the intermediate base, is formed in a sidewall of the battery housing. Such an integration of collector ducts serving as risers into the battery housing enables the achievement of especially small dimensions of the battery vertically as relates to the vertical direction when the battery in the motor vehicle is arranged, for example, in the vehicle's longitudinal direction (X direction). This compact formation of the battery is also advantageous with respect to saving installation space and providing installation space for a deformation and/or for deformation elements. Thus, the crash performance can also be improved by means of this embodiment. Furthermore, separate pipework for providing the at least one collector duct can be dispensed with. This also provides a cost savings.

Preferably, the at least one collector duct is formed by plugging housing parts of the battery housing together. This results in a simple installation when producing the battery housing by means of such a plug-in connection. This also provides cost advantages.

In particular, a collector duct section of a first housing part can be introduced into a collector duct section of a second housing part. In this manner, the leak-tightness of the collector duct can be very easily assured when plugging the housing parts together.

The at least one duct can be provided as a duct, which is closed about the circumference, in the heat-conducting plastic when producing the at least one wall. The at least one duct can be provided especially simply, particularly in an injection-molding process, when the duct comprises a recess formed in the heat-conducting plastic. The heat-conducting plastic then forms a partial section, particularly a substantial component, of the duct for the cooling medium. The at least one duct in this case can be incorporated and/or molded directly into the plastic on the side of the heat-conducting plastic facing away from the battery module.

Preferably, the at least one recess is closed on a side of the heat-conducting plastic facing away from the battery module by means of a cover element. For example, a foil can be used as such a cover element, it being possible to connect said foil to the heat-conducting plastic with friction-locking by means of welding, for example, particularly laser welding. Due to the fact that this foil and/or this cover element is arranged on the side of the heat-conducting plastic facing away from the battery module, the side, which is closed by the cover element, of the at least one duct is not in the area of the battery module and/or in the module layer. This means that no cooling medium can penetrate the battery module even in the event of damage to the cover element.

Additionally or alternatively, the at least one duct may comprise a recess, which is formed on a side of the heat-conducting plastic facing away from the battery module, in a further layer of the at least one wall. In this case, the heat-conducting plastic covers the further layer. This enables provision of the cooling device in a simple and low-effort manner with an especially simple construction of the layer of the at least one wall, said layer being formed by the heat-conducting plastic.

The further layer may be formed from a metal such that the at least one wall meets the structural requirements, particularly with respect to mechanical properties of the battery housing.

However, the at least one duct can be provided especially simply when the further layer is formed from a plastic material. Preferably, the plastic material has greater strength and/or stiffness than the heat-conducting plastic. For example, it may be provided that the plastic material is formed as a fiber-reinforced plastic.

In this manner, the structural requirements such as, for example, the accommodation of the battery modules, the transfer of loads in the case of accelerations, in an impact or crash, vibrations, or equivalent force applications can be fulfilled especially easily. With respect to mechanical properties such as, for example, the strength, the stiffness, and resilience, the particular fiber-reinforced plastic material is thus more resilient than the heat-conducting plastic. In addition, the plastic material, which satisfies the structural requirements placed on the battery in an improved manner, can be cost-effectively and thus economically provided. In particular, this plastic material is more cost-effective than the heat-conducting plastic.

Preferably, an area, in which the at least one wall has the heat-conducting plastic, is smaller than a surface, with which the at least one battery module fits closely on the wall. This enables particularly the wall to be formed from the strongly resilient plastic material with respect to the mechanical properties in areas, adjacent to this area, of the at least one wall. Thus, an efficient dissipation of heat from the at least one battery module can be achieved. Simultaneously, it can be assured that the at least one wall can withstand loads that occur without any problem, particularly when using the battery in the motor vehicle.

In order to provide the area with the at least one heat-conducting plastic in the at least one wall and to form the remaining areas of the at least one wall from the mechanically more strongly resilient plastic material, particularly a two-component injection-molding process can be used. In particular, an especially great strength can be achieved through bi-injection. However, an insert may also be inserted into a mold and injection-molded.

It has been shown to be further advantageous when an intake to and an outlet from the at least one duct is formed as a single piece with the battery housing. Thus, connections for the supply and removal of the cooling medium can be integrated directly into the wall, particularly directly into the base and/or the intermediate base. This also helps with dispensing of additional pipework and obtaining additional installation space.

Depending on the component dimensions and the compensating tolerances, a heat-conducting foil or pad may further be arranged between the at least one wall, particularly between the base and/or intermediate base, and a wall of the battery module. Such a foil or pad can be used for tolerance compensation and simultaneously obtains an especially uniform contact surface, with which the battery module fits closely on the at least one wall of the battery housing. However, an additional cooling plate or a heat exchanger can be dispensed with.

The battery cells may particularly be formed as lithium-ion cells, which have a respective cell housing. The batteries are connected to one another in an electrically-conducting manner in the respective battery module via electrical connections or terminals leading out of the respective cell housing.

Preferably, the battery is formed as a high-voltage battery, which has a plurality of battery modules. Such a high-voltage battery, which provides a nominal voltage of more than 60 V, for example a nominal voltage of about 300 V to about 600 V, can be used especially well as an electrical energy storage device for the motor vehicle, for example when the motor vehicle is formed as an electric vehicle or hybrid vehicle.

The motor vehicle according to the invention comprises at least one battery according to the invention. Preferably, electrical energy for a drive unit of the motor vehicle, said drive unit being formed to propel the motor vehicle, can be provided by means of the battery.

The invention also includes further embodiments of the motor vehicle, which have features as they have already been described in association with the further embodiments of the battery. For this reason, the corresponding further embodiments of the motor vehicle are not described again here.

BRIEF DESCRIPTION OF THE FIGURES

An exemplary embodiment of the invention is described in the following. The following is shown:

FIG. 1 schematically and sectionally shows a section of a battery for a motor vehicle, wherein ducts for a coolant are formed in a base and in an intermediate base of a battery housing of the battery;

FIG. 2 schematically and sectionally shows housing parts of a variant of the battery housing, wherein the ducts for the cooling medium are formed in a heat-conducting plastic of an intermediate base of the battery housing;

DETAILED DESCRIPTION

The exemplary embodiment explained in the following refers to a preferred embodiment of the invention. With the exemplary embodiment, the described components of the embodiment represent individual features of the invention that are to be considered independently from one another, each of which also further develop the invention independently of one another and thus also are to be considered individually or in a combination that is different than the one shown as a component of the invention. Furthermore, the described embodiment can also be supplemented through further described features of the invention.

In the figures, elements which are functionally equivalent are each given the same reference numbers.

Figure 3:
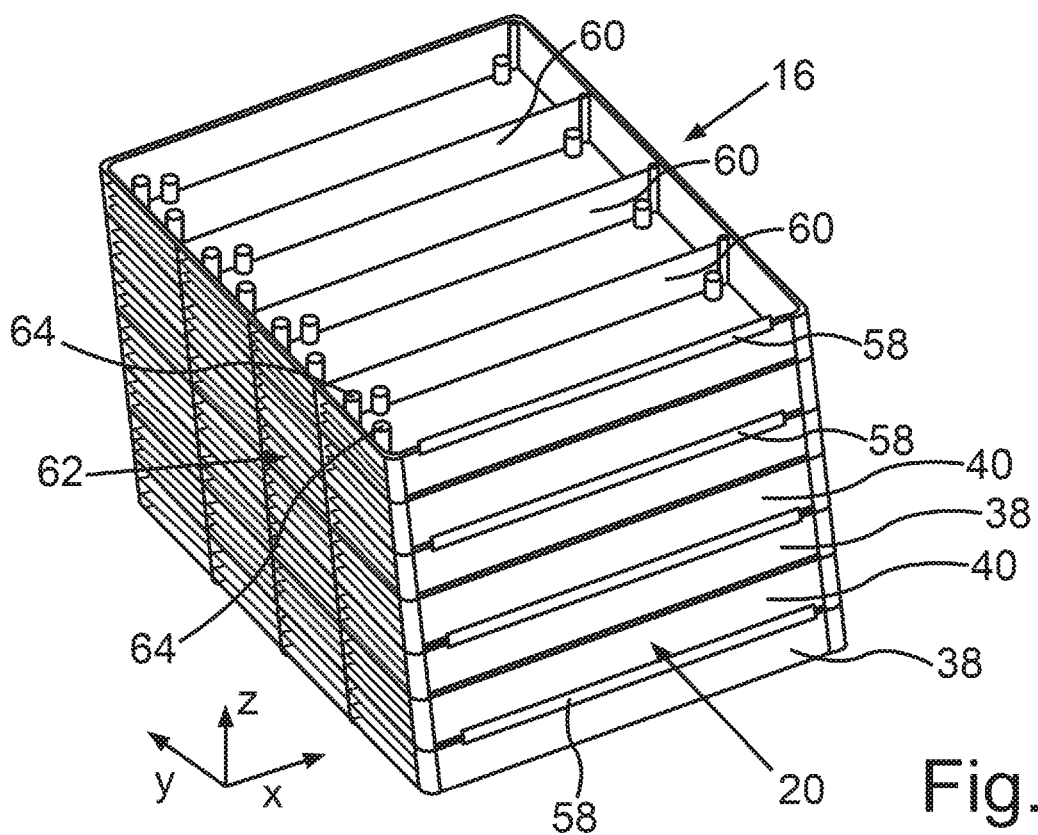
FIG. 3 is a perspective view of a plurality of housing parts according to FIG. 2 stacked on top of one another.

A battery 10, sectionally shown in FIG. 1, for a motor vehicle comprises a plurality of battery modules 12, 14 arranged on top of one another, wherein only a first battery module 12 and a second battery module 14 are shown in FIG. 1. However, as seen from the perspective view of a battery housing 16 of the battery 10, which is shown in FIG. 3, more than two such layers or levels (for example 4 levels) of battery modules 12, 14 stacked on top of one another may be provided in the battery 10. Each of the battery modules 12, 14 comprises a module housing 18, which is not shown in more detail, in which battery cells are arranged, which are connected to one another in an electrically conductive manner. Accordingly, the battery module 12, 14 provides a greater electrical voltage and/or a greater electrical current than would be provided by a single battery cell.

Walls of the battery housing 16 comprise a sidewall 20, a base 22, and an intermediate base 24 (cf. FIG. 1). The first battery module 12 fits closely with the base 22. In particular, the first battery module 12 is attached to the base 22 or pressed against the base 22 by means of screws 26. In a similar manner, the second battery module 14, which is arranged in a vertical direction Z of the battery 10 above the first battery module 12, is attached to the intermediate base 24 by means of screws 26.

With such an arrangement of the battery modules 12, 14 in the vertical direction Z of the battery 10 above one another, it has proven to be difficult to house the cooling devices for cooling the battery cells of the battery modules in a space-saving manner. However, this is achieved in a space-saving manner in that the cooling devices assigned to the respective battery modules 12, 14 are integrated into walls of the battery housing 16, namely into the base 22 and the intermediate base 24.

To this end, the base 22 and the intermediate base 24 comprise a layer of a heat-conducting plastic 28. The respective battery module 12, 14 is arranged on the heat-conducting plastic 28 of the base 22 and/or the intermediate base 24. In other words, the respective battery module 12, 14 fits closely with the heat-conducting plastic 28. The heat-conducting plastic 28 in this case restricts a plurality of ducts 30, which are formed in a further layer 32 of the base 22 and/or the intermediate base 24.

The preferably thermoplastic, heat-conducting plastic 28 here has a thermal conductivity of more than 0.8 W/mK, particularly more than 1 W/mK. This ensures that there is a transfer of heat from the battery cells to be cooled of the respective battery module 12, 14 to a cooling medium for example a cooling fluid, via the heat-conducting plastic 28. The cooling medium flows through the ducts 30 in cooling mode. In a similar manner, a heating of the battery modules 12, 14 can also be achieved by means of the cooling medium, for example, to quickly bring the battery cells to a desired operating temperature.

An area of the base 22 and/or the intermediate base 24, in which the layer 32 arranged under the heat-conducting plastic 28 has ducts 30, is sealed in this case by means of a seal 34, for example in the form of an O-ring. An edge area of the heat-conducting plastic 28 may be connected to the layer 32 by means of an adhesive 36 for an additional sealing of the heat-conducting plastic 28 relative to the layer 32 of the base and/or the intermediate base 24.

The layer 32 of the base 22 and/or the intermediate base 24, in which the screws 26 engage, is formed from a fiber-reinforced plastic material in this case. This ensures that the battery housing 16 meets the mechanical structural requirements placed on it. For example, the plastic material of the layer 32 is formed such that it can withstand the loads occurring in the driving operation of the motor vehicle in the event of accelerations, an accident, vibrations, and the like. The thermal management of the battery 10 is ensured by the cooling device integrated into the base 22 and/or the intermediate base 24.

In addition, the ducts 30, through which the cooling medium flows, are positioned outside of the module level, that is outside of the battery modules 12, 14. Because the cooling medium is typically electrically conductive, it is ensured that the cooling medium does not reach the respective battery module 12, 14 in the event of a leak of the cooling system and/or the cooling device. Hazards from faulty functions such as, for example, of an electrical short circuit, are thereby prevented.

Due to the combining of the heat-conducting plastic 28 with the layer 32 of the preferably fiber-reinforced plastic material, a heat exchanger made of plastic is provided by means of the base 22 and/or the intermediate base 24. This is advantageous to the extent that there are narrow limits placed on the design freedom with typical heat exchangers made of metal, said design freedom being restricted by the production process and by the use of metal. Thus, a heat exchanger with complex cooling ducts can be easily provided through the use of plastic for layer 32 and for the layer of heat-conducting plastic 28 with which the respective battery module 12, 14 closely fits.

For example, ribs may be formed (cf. FIG. 1) on the surface of the layer 32 facing the heat-conducting plastic 28, said ribs laterally restricting the ducts 30. In this case, the heat-conducting plastic 28 restricts the ducts 30 upward in the base 22 and/or the intermediate base 24. Accordingly, the ducts 30 are only partially integrated into the plastic material of the layer 32. However, it may be provided that the ducts 30 are formed completely sealed on the circumference in the layer 32. The ducts 30 are then completely integrated into the layer 32. A thickness of the layer 32 in the vertical direction Z of the battery 10 may be, for example, approximately 5 mm.

With the variant of the battery 10 shown in FIG. 2, only two housing parts 38, 40 of the battery housing 16 are shown schematically. A cover, which covers the battery modules 12, 14 arranged in a respective layer of the battery on the top side, is provided by the hood-like first housing part 40 in this case. Furthermore, a mounting area for the battery module 12, 14 arranged in the respective layer is provided by a second housing part 38, which is shaped like a trough or tub. FIG. 2 shows an example of the hood-like housing part 40 for battery module 12 arranged in the bottom-most layer of the battery 10 and the trough-like housing part 38 for battery module 14 arranged in the layer underneath.

With the variant of the battery 10 shown schematically in FIG. 2, the heat-conducting plastic 28 is only present in an area 42 of the intermediate base 24 which is provided by the trough-like housing part 38. In contrast, the intermediate base 24 made of the mechanically more resilient plastic material, particularly fiber-reinforced plastic material, is formed in areas 44 on both sides adjacent this area 42.

Furthermore, the ducts 30 are formed here in the heat-conducting plastic 28 with this variant. In order to also restrict the ducts 30 downwardly, which are laterally restricted by ribs formed in the heat-conducting plastic 28, a cover element, for example in the form of a foil 46, is arranged on the side of the ducts 30 originally open externally. The foil 46 may be connected to the heat-conducting plastic 28, for example, through laser welding in order to close the ducts 30 circumferentially. However, it can also be assured that the ducts 30 are sealed in a different manner, for example through durable and/or complete injection-molding. Toothing or similar structural elements may be provided in an edge area 48 of the heat-conducting plastic 28, which are used to connect the heat-conducting plastic 28 to the fiber-reinforced plastic surrounding it.

A wall thickness of the respective housing part 38, 40 is preferably dimensioned such that the most compact size possible of the battery 10 is achieved in the transverse direction Y, which may coincide particularly with the vehicle's transverse direction (Y direction) upon installation of the battery 10 in the motor vehicle.

Preferably, ribs 50 are provided on the housing parts 38, 40, on the respective outer side, in the transverse direction Y. Such ribs 50 may be used for attachment of a profile part 52, which may be formed, for example, from steel and/or an aluminum alloy. Such a profile part 52 can be placed, for example, onto the battery housing 16 from the outside such that the ribs 50 engage with corresponding grooves in the profile part 52. Preferably, the profile part 52 is formed consistently such that it extends in the vertical direction Z over multiple, particularly all, layers, in which the battery modules 12, 14 are arranged. Good anchoring of the profile part 52 on the battery housing 16 can be achieved from the engagement of the ribs 50, made of plastic, with the profile part 52, preferably made of steel. Such a profile part 52 is used, particularly, as protection in the event of impact force to the battery 10 caused by a crash.

A separating layer, in which the hood-like housing part 40 and the trough-like housing part 38 adjoin one another, is formed here in the area of bars 54, 56 of the housing parts 38, 40, said bars protruding toward the outer side of the battery 10. Preferably, these bars 54, 56 are located essentially in the center, as relates to the height of the respective battery modules 12, 14, when viewed in the vertical direction Z. This means that a draft angle of the housing parts 38, 40 leads to an especially small dimension of the battery housing 16 in the transverse direction Y.

Further, for example strip-like, profile parts 58 may be provided on the housing parts 38, 40, stacked on top of one another, in the area of the bars 54, 56 (cf. FIG. 3). FIG. 3 additionally shows a longitudinal direction X of the battery housing 16, which preferably coincides with the vehicle's longitudinal direction (X direction) upon installation of the battery 10 in the motor vehicle. Accordingly, the profile parts 58 extend in the longitudinal direction X.

Furthermore, FIG. 3 shows that multiple battery modules 12, 14 can be arranged next to one another in any level, restricted by housing part 38 and housing part 40 placed thereupon, in the transverse direction Y of the battery 10. In this case, chambers for four battery modules 12, 14 are defined, for example, by separating walls 60 in any layer of the battery 10. In variants, more or less than the number of battery modules 12, 14 shown by example per layer and/or level of the battery 10 can be provided.

Figure 4:
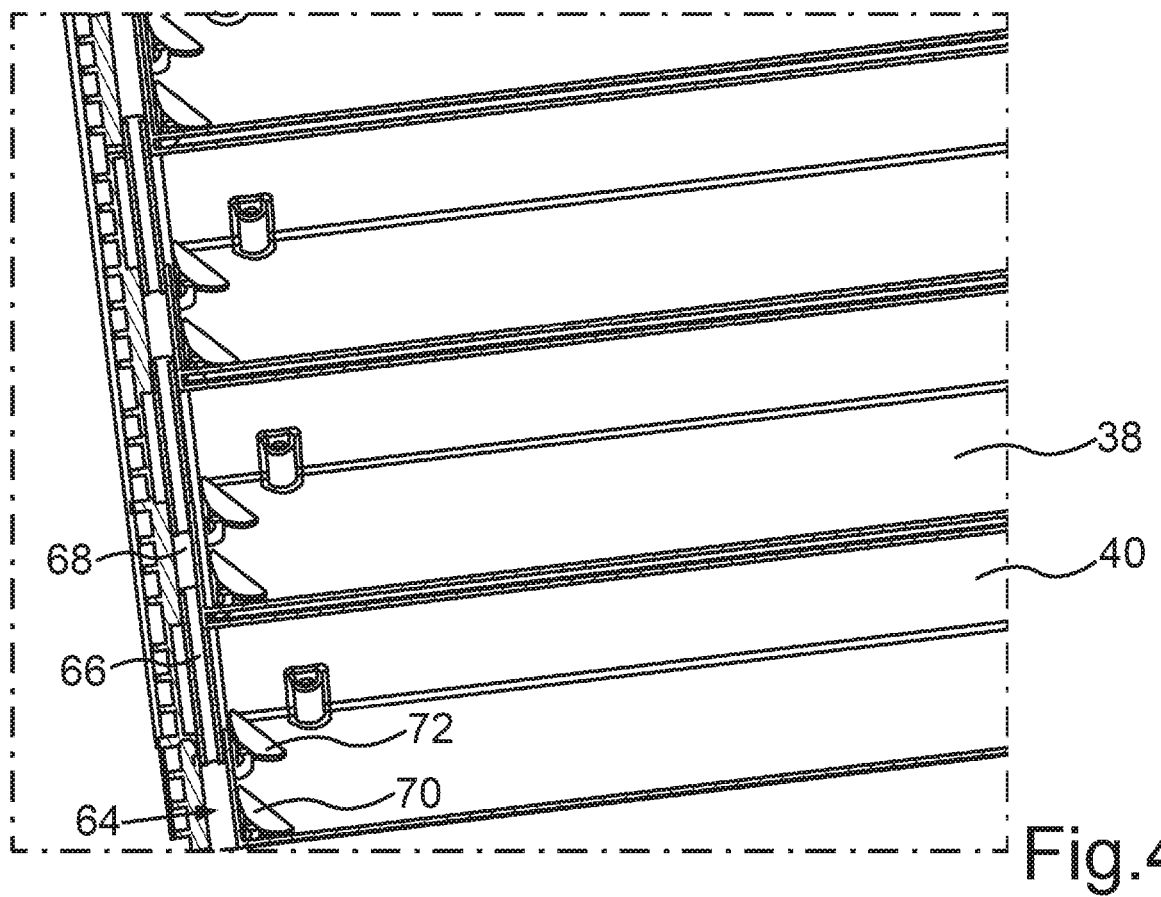
FIG. 4 is a sectional view of a section of the battery housing according to FIG. 3.

Particularly when viewed together with FIG. 4, it is clear that collector ducts 64 and/or risers are formed in a sidewall 62 of the battery housing 16, said sidewall being at the front or rear in the longitudinal direction X. The installation space requirements of the battery 10 in the longitudinal direction X can be especially extensively reduced due to the integration of the risers and/or collector ducts 64 into the sidewall 62 of the battery housing 16. The collector ducts 64 in this case enable an impact of the respective ducts 30 in the base 22 and the intermediate bases 24 by means of all four levels of the battery housing 16. In comparison with a battery housing in which the battery modules 12, 14 might be arranged above one another in four levels, but the ducts 30 are not integrated into the base 22 and the intermediate bases 24, but instead extruded parts are provided, a reduction of 12 cm can be achieved in the vertical direction Z with the battery housing 16 according to FIG. 3.

The sectional view of one of the collector ducts 64 in FIG. 4 shows that the housing parts 38, 40 are coupled together by plugging and/or a plug connection. In this case, a collector duct section 66 of the first housing part 40 can be introduced into a collector duct section 68 of the second housing part 38. Furthermore, FIG. 4 easily shows that an intake 70 and an outlet 72 for the cooling medium are formed as a single piece with the wall material of the respective housing parts 38, 40. The ducts 30 can be impacted with the cooling medium via the intake 70, and the cooling medium can be discharged from the ducts 30 via the outlet 72.

As a whole, the example shows how a function-integrated intermediate base 24 including risers can be obtained for coolant distribution in the battery 10 by means of the invention.

The invention claimed is:

1. A battery for a motor vehicle, comprising:
at least one battery module, which has a plurality of battery cells, wherein the at least one battery module is arranged in a battery housing of the battery, and with a cooling device for cooling the battery cells by means of a cooling medium,
wherein the cooling device comprises at least one wall of the battery housing, with which the at least one battery module closely fits, and which is formed from a heat-conducting plastic at least in areas, which restricts at least one duct for the cooling medium, with the duct being formed in at least one wall of the battery housing, and
wherein the at least one duct comprises a recess, which is formed on a side of the heat-conducting plastic facing away from the battery module, in a further layer of the at least one wall, wherein the heat-conducting plastic covers the further layer.

2. The battery according to claim 1, wherein the at least one wall is formed as a base of the battery housing and/or as an intermediate base of the battery housing, wherein the intermediate base is arranged between a first battery module and a second battery module arranged above the first battery module in a vertical direction of the battery.

3. The battery according to claim 2, wherein at least one collector duct, by means of which the cooling medium can be placed in the at least one duct formed in the base and in the at least one duct formed in the intermediate base, is formed in a sidewall of the battery housing.

4. The battery according to claim 3, wherein the at least one collector duct is formed by plugging housing parts of the battery housing together, wherein particularly a collector duct section of a first housing part is introduced into a collector duct section of a second housing part.

5. The battery according to claim 1, wherein the at least one duct comprises a recess formed in the heat-conducting plastic.

6. The battery according to claim 1, wherein the further layer is formed from a metal and/or from a plastic material which has greater strength and/or stiffness than the heat-conducting plastic.

7. The battery according to claim 1, wherein an area, in which the at least one wall has the heat-conducting plastic, is smaller than a surface, with which the at least one battery module fits closely on the wall.

8. The battery according to claim 1, wherein an intake to and an outlet from the at least one duct is formed as a single piece with the battery housing.

9. A motor vehicle with at least one battery according to claim 1, wherein electrical energy for a drive unit of the motor vehicle, said drive unit being formed to propel the motor vehicle, can be provided by means of the at least one battery.

* * * * *